No. 655,049. Patented July 31, 1900.
O. P. BROWN.
CUSHION TIRE.
(Application filed Dec. 22, 1899.)
(No Model.)
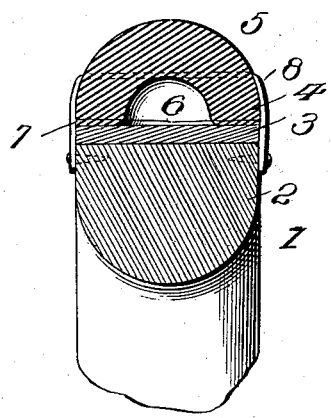
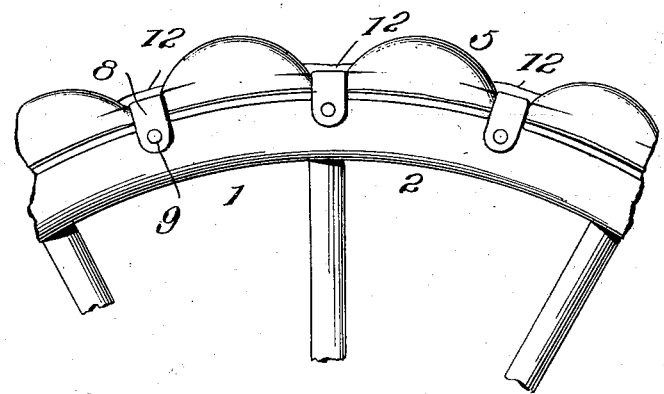
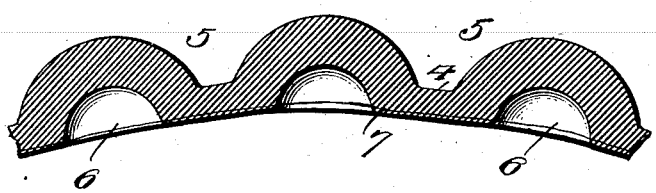
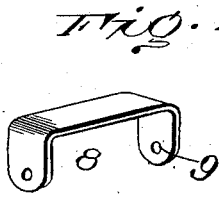
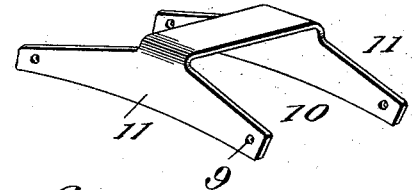
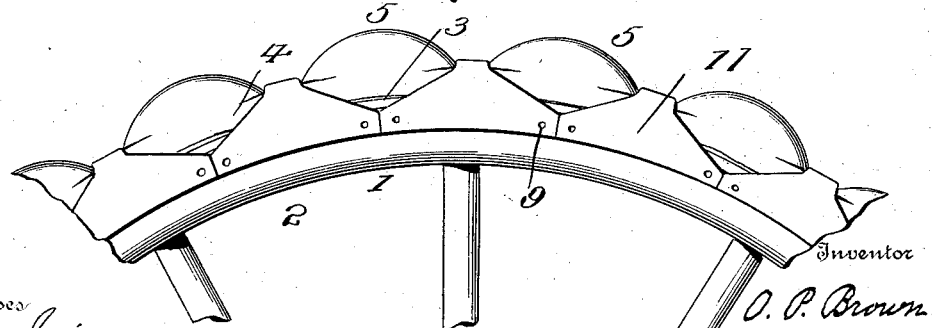

UNITED STATES PATENT OFFICE.

OSCAR P. BROWN, OF PROVIDENCE, RHODE ISLAND, ASSIGNOR TO WEBBER G. KENDALL, OF SAME PLACE.

CUSHION-TIRE.

SPECIFICATION forming part of Letters Patent No. 655,049, dated July 31, 1900.

Application filed December 22, 1899. Serial No. 741,319. (No model.)

*To all whom it may concern:*

Be it known that I, OSCAR P. BROWN, a citizen of the United States, residing at Providence, in the county of Providence and State of Rhode Island, have invented certain new and useful Improvements in Cushion-Tires; and I do hereby declare the following to be a full, clear, and exact description of the invention, such as will enable others skilled in the art to which it appertains to make and use the same.

My invention relates to cushion-tires for vehicle-wheels; and it consists, essentially, of a rubber band or strip adapted to be bent around the rim of a wheel having a flat inner periphery and a series of equidistant semispherical projections on its outer periphery, each projection being formed with a cavity to give to the tire the requisite amount of resiliency.

The invention further consists of certain novel means for securing the tire onto the wheel.

The principal object of the invention is to produce a simple and inexpensive form of cushion-tire which will be sufficiently resilient to render riding easy and comfortable and sufficiently durable to withstand the wear and tear to which it may be subjected.

In the accompanying drawings, Figure 1 is a transverse sectional view of the rim of a wheel and my improved tire applied thereto; Fig. 2, a central longitudinal section of a portion of the tire; Fig. 3, a side view of a portion of a wheel, showing one means of attaching the tire to the wheel; Fig. 4, a perspective view of the attaching means; Fig. 5, a similar view of another form of attaching means; and Fig. 6, a side view of a portion of a wheel, showing the modified form of attaching means securing the tire thereon.

Referring to the several views, the numeral 1 indicates a portion of a wheel, 2 the felly, and 3 the metal tire thereof.

The numeral 4 indicates the rubber tire, which consists, preferably, of a single band or strip, the width of the metal tire having a flat inner periphery and provided with a series of equidistant semispherical or round-headed projections 5 on its outer peripheral surface. Each projection is formed with a cavity 6, which passes through the band or strip from its inner periphery and extends up into the projection a sufficient distance to give the requisite resiliency to the tire. The inner periphery of the tire or strip may be, if desired, lined with a strip of canvas 7, in which case the canvas strip is perforated to correspond with the cavities passing through the band up into the projections. The canvas strip may be secured to the band by cement or other suitable means.

While the rubber tire is preferably molded in a single piece, it may, if desired, be molded in two or more sections.

In securing the rubber tire onto the wheel I prefer to use staples 8, one between each round-headed projection. These staples fit over the rubber tire, and their legs are provided with holes 9 for the reception of securing nails or screws. While it is preferred to place a staple between each round-headed projection, it is not absolutely necessary, as the tire may be securely attached to the wheel by a lesser number of staples.

Instead of the staples 8 with which to secure the tire onto the wheel I may use a yoke 10. (Shown in Fig. 5.) The ends of this yoke are provided with oppositely-extending wings 11, which contact with the ends of each adjacent yoke, as shown in Fig. 6, so as to present a continuous ring-like form.

One of the important features of my invention is the means by which my improved rubber tire is secured onto the wheel. In most instances rubber tires having flat inner peripheries are secured in specially-constructed rims by tightening-wires and when applied to the ordinary rim are secured thereon by continuous clamping bands or rings. By the use of staples or yokes the securing of the tire onto the wheel, especially the ordinary metal-tired wheel now in use, is rendered comparatively easy, not requiring the use of special tools and skilled labor, as is the case with the continuous clamping band or ring. Another advantage in the use of the staples or yokes is that in securing a tire of my construction onto the wheel the projections at the respective ends of the tire may be spaced apart the same distance as that between the other projections by either slightly crowding or stretching the tire, thus preserving uniformity of appearances of the projections.

Various modifications may be made without departing from the spirit of my invention or sacrificing the principle thereof—such, for instance, as forming over each staple or yoke a bridge 12, of rubber, as shown at *a*, Fig. 3, for the purpose of cushioning sudden shock or jar in striking obstructions in the roadway and preventing the possible lodgment of dirt and other matter between the round-headed projections.

Having thus fully described my invention, what I claim, and desire to secure by Letters Patent, is—

1. The combination with the rim of a wheel, of a rubber tire consisting of a band having projections on its outer periphery and a cavity extending through its inner periphery up into each of said projections, and a series of independent staples for attaching the tire to the wheel.

2. The combination with the rim of a wheel, of a rubber tire consisting of a band provided on its outer periphery with a series of projections, and a series of independent staples, having their ends provided with oppositely-extending wings, for securing the tire onto the wheel.

3. The combination with the rim of a wheel, of a rubber tire consisting of a band provided with a series of projections on its outer periphery, a series of independent securing devices for attaching the tire onto the wheel, and a protecting covering for each screwing device between the projections.

4. The combination with the rim of a wheel, of a rubber tire consisting of a band having projections on its outer periphery and a cavity in each projection, extending through its inner periphery, a lining of canvas on the inner periphery of the tire, and independent staples for securing the tire to the wheel.

In testimony whereof I affix my signature in the presence of two witnesses.

OSCAR P. BROWN.

Witnesses:
WEBBER G. KENDALL,
FRANK T. EASTON.